(12) United States Patent
Cheng et al.

(10) Patent No.: US 10,615,883 B1
(45) Date of Patent: Apr. 7, 2020

(54) WAVELENGTH DIVISION MULTIPLEXING MODULE

(71) Applicant: ELITE ADVANCED LASER CORPORATION, New Taipei (TW)

(72) Inventors: Chu-Liang Cheng, New Taipei (TW); Chi-Hua Wang, Taipei (TW)

(73) Assignee: ELITE ADVANCED LASER CORPORATION, New Taipei (TW)

( * ) Notice: Subject to any disclaimer, the term of this patent is extended or adjusted under 35 U.S.C. 154(b) by 0 days.

(21) Appl. No.: 16/297,754

(22) Filed: Mar. 11, 2019

(30) Foreign Application Priority Data

Oct. 25, 2018 (TW) .............................. 107214519 U

(51) Int. Cl.
*H04B 10/67* (2013.01)
*H04J 14/02* (2006.01)
*H04B 10/50* (2013.01)
*G02B 6/42* (2006.01)

(52) U.S. Cl.
CPC ........... *H04B 10/67* (2013.01); *G02B 6/4214* (2013.01); *G02B 6/4215* (2013.01); *H04B 10/506* (2013.01); *H04J 14/02* (2013.01)

(58) Field of Classification Search
CPC .... H04B 10/506; H04B 10/67; G02B 6/4214; G02B 6/4215
See application file for complete search history.

(56) References Cited

U.S. PATENT DOCUMENTS

| | | | |
|---|---|---|---|
| 2005/0100348 A1* | 5/2005 | Cho | G02B 6/4201 398/196 |
| 2005/0152640 A1* | 7/2005 | Lemoff | G02B 6/125 385/24 |
| 2012/0189306 A1* | 7/2012 | Du | G02B 6/4215 398/65 |

* cited by examiner

*Primary Examiner* — Casey L Kretzer
(74) *Attorney, Agent, or Firm* — JCIPRNET

(57) ABSTRACT

A wavelength division multiplexing module adapted to combine a plurality of light beams to a mixed light beam is provided. The wavelength division multiplexing module includes a housing, a plurality of light emitting elements, an optical division element, and a plurality of reflectors. The light emitting elements are adapted to provide light beams. The optical division element is disposed on a transmission path of the light beams. The reflectors are disposed on the transmission path of the light beams. The optical division element has a reflection region and a light transmission region on one side opposite to the light emitting elements. The reflection region is adapted to reflect a portion of the light beams, and the light transmission region is adapted to allow the mixed light beam to pass through. At least two of the light emitting elements are arranged in an extending direction of the housing.

18 Claims, 4 Drawing Sheets

WAVELENGTH DIVISION MULTIPLEXING MODULE

CROSS-REFERENCE TO RELATED APPLICATION

This application claims the priority benefit of Taiwan application serial no. 107214519, filed on Oct. 25, 2018. The entirety of the above-mentioned patent application is hereby incorporated by reference herein and made a part of this specification.

BACKGROUND

Technical Field

The invention relates to an optical module. More particularly, the invention relates to a wavelength division multiplexing module.

Description of Related Art

With advancements in communication technologies, communication methods are no longer limited by implementation using electrical signals. In recent technological development, optical communication technologies have been developed to realize signal transmission with optical signals. Because transmission speed and distance of light is far higher and longer than electrons, optical communication technologies have gradually become the mainstream in the market. Therefore, based on high bandwidth requirements, demands for optical transceiver modules capable of transmitting massive amount of optical signal also become higher each day.

However, costs in deployment of optical cables can be fairly expensive. Correspondingly, when optical signals transmittable within one optical cable are to be increased, other than increasing signal frequency, it often requires light rays with various wavelengths to be introduced and combined within the same optical fiber cable in order to significantly increase signal transferring amount. A wavelength division multiplexer (WDM) is one of the solutions to achieve such objective. Nonetheless, the existing wavelength division multiplexer involves numerous components, which lead to higher costs and lower yield rate in the manufacturing process due to complexity in terms of configuration. Therefore, how to provide the wavelength division multiplexer designed with simple architecture, lesser space occupied in the device and wider application for multiple devices has long been an issue to be addressed by persons skilled in the art.

SUMMARY

The invention provides a wavelength division multiplexing module having reduced volume and a simple structure.

The invention provides a wavelength division multiplexing module adapted to combine a plurality of light beams to a mixed light beam. The wavelength division multiplexing module includes a housing, a plurality of light emitting elements, an optical division element, and a plurality of reflectors. The light emitting elements are disposed in the housing and are adapted to provide the light beams. The optical division element is disposed on the housing and a transmission path of the light beams. The reflectors are disposed on the housing and the transmission path of the light beams and are located between the light emitting elements and the optical division element. The optical division element has a reflection region and a light transmission region on one side opposite to the light emitting elements. The reflection region is adapted to reflect a portion of the mixed light beam, and the light transmission region is adapted to allow specific light beams to pass through. At least two of the light emitting elements are arranged in an extending direction of the housing.

The invention further provides a wavelength division multiplexing module adapted to convert a mixed light beam to a plurality of light beams. The wavelength division multiplexing module includes a housing, a plurality of light receiving elements, an optical division element, and a plurality of reflectors. The light receiving elements are disposed in the housing and are adapted to receive the light beams. The optical division element is disposed on the housing and a transmission path of the light beams. The reflectors are disposed on the housing and the transmission path of the light beams and are located between the light receiving elements and the optical division element. The optical division element has a reflection region and a light transmission region on one side opposite to the light receiving elements. The reflection region is adapted to reflect a portion of the mixed light beam, and the light transmission region is adapted to allow specific light beams to pass through. At least two of the light receiving elements are arranged in an extending direction of the housing.

In an embodiment of the invention, wavelengths of the light beams are different.

In an embodiment of the invention, the light beams and the mixed light beam are transmitted on a same plane.

In an embodiment of the invention, the light emitting elements are fixed to the housing through soldering.

In an embodiment of the invention, the light emitting elements are arranged in the extending direction of the housing, and a number of the light emitting elements is identical to a number of the reflectors.

In an embodiment of the invention, a light emitting direction of a portion of the light emitting elements is parallel to the extending direction of the housing, and a number of the other portion of the light emitting elements is identical to the number of the reflectors.

In an embodiment of the invention, the light receiving elements are fixed to the housing through soldering.

In an embodiment of the invention, the light receiving elements are arranged in the extending direction of the housing, and a number of the light receiving elements is identical to a number of the reflectors.

In an embodiment of the invention, an optical axis direction of a portion of the light receiving elements is parallel to the extending direction of the housing, and a number of the other portion of the light receiving elements is identical to a number of the reflectors.

In an embodiment of the invention, an included angle between an extending direction of the reflectors and the extending direction of the housing is 45 degrees.

In an embodiment of the invention, the optical division element comprises a plurality of selective reflection elements disposed on one side opposite to the reflection region, the selective reflection elements are adapted to allow light ray with specific wavelengths to pass through, and specific wavelengths corresponding to the selective reflection elements individually correspond to wavelengths of the light beams.

In an embodiment of the invention, the wavelength division multiplexing module further includes a connection element disposed on the housing and a transmission path of the mixed light beam.

In an embodiment of the invention, the transmission path of the light beams adjacent to the optical division element and a transmission path of the mixed light beam adjacent to the optical divisions element are parallel to each other.

To sum up, in the wavelength division multiplexing module provided by the invention, wavelength division or multiplexing is performed on the light beams or the mixed light beam through the reflection region and the light transmission region on one side of the optical division element. Further, at least two of the light emitting elements or the light receiving elements are arranged in the extending direction of the housing. Therefore, the design of the housing may be simple, the wavelength division multiplexing module may be easily calibrated since the light ray angles in the wavelength division multiplexing module are susceptible to less changes, and that the volume taken up by the wavelength division multiplexing module is effective reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
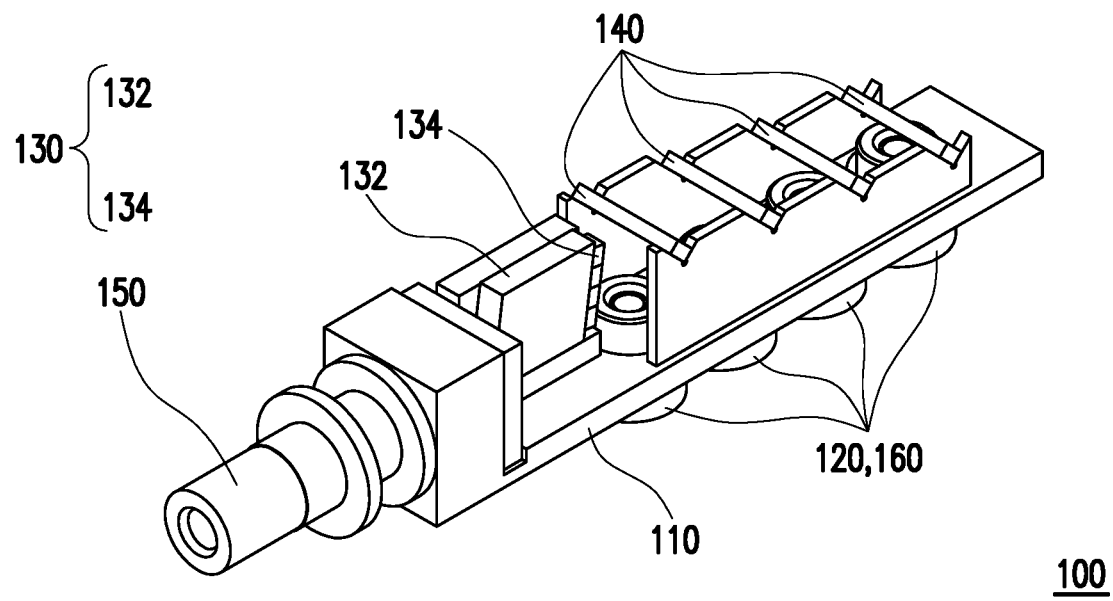
FIG. 1 is a schematic three-dimensional view of a wavelength division multiplexing module according to an embodiment of the invention.
Figure 2:
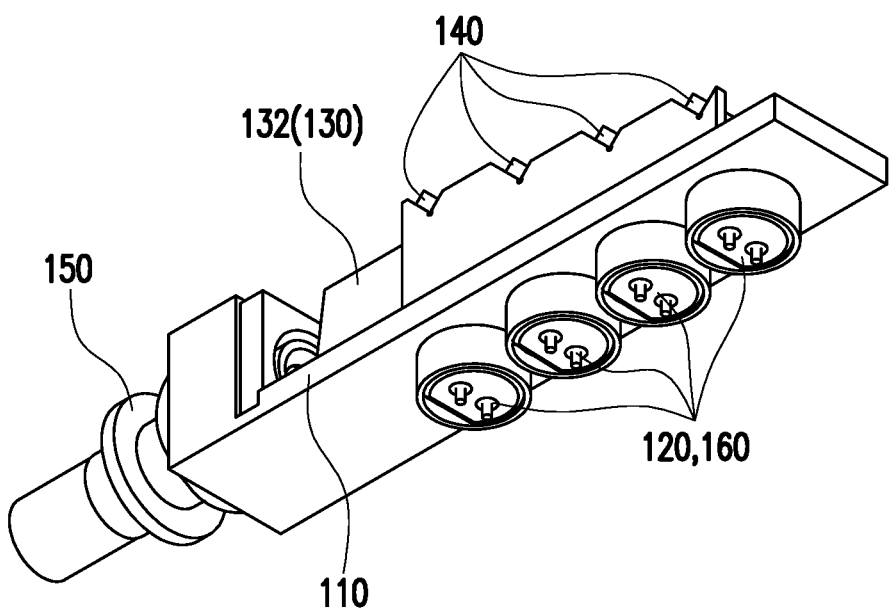
FIG. 2 is a schematic three-dimensional view of the wavelength division multiplexing module of FIG. 1 from another view angle.

FIG. 1 is a schematic three-dimensional view of a wavelength division multiplexing module according to an embodiment of the invention. FIG. 2 is a schematic three-dimensional view of the wavelength division multiplexing module of FIG. 1 from another view angle. With reference to FIG. 1 and FIG. 2, a wavelength division multiplexing module 100 provided by the invention is adapted to combine a plurality of light beams to a mixed light beam or is adapted to convert a mixed light beam to a plurality of light beams. The wavelength division multiplexing module 100 can be applied to serve an optical signal device using optical signals with multiple wavelengths, such as a coarse wavelength division multiplexer (CWDM), a dense wavelength division multiplexer (DWDM), or optical signal devices of other types. The wavelength division multiplexing module 100 adapted to combine the light beams to the mixed light beam is taken as an example in a majority part of the description below.

Figure 3:
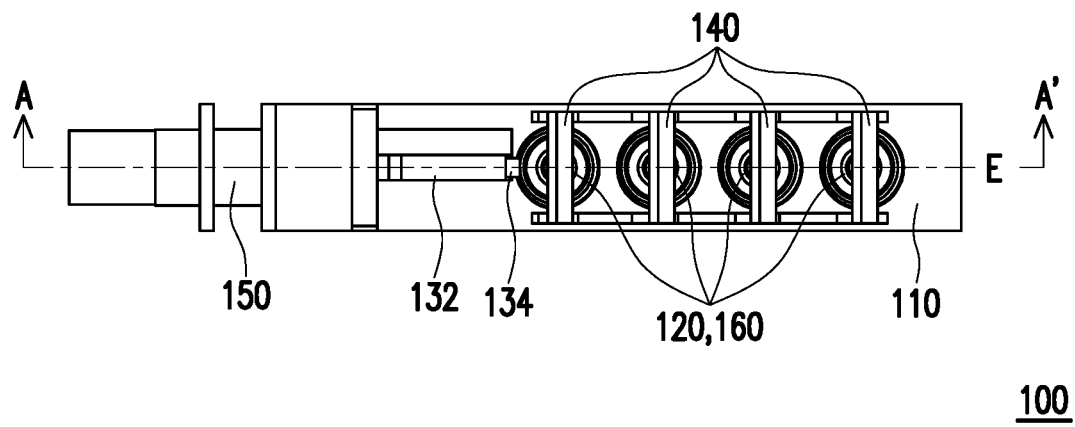
FIG. 3 is a schematic top view of the wavelength division multiplexing module of FIG. 1.
Figure 4:
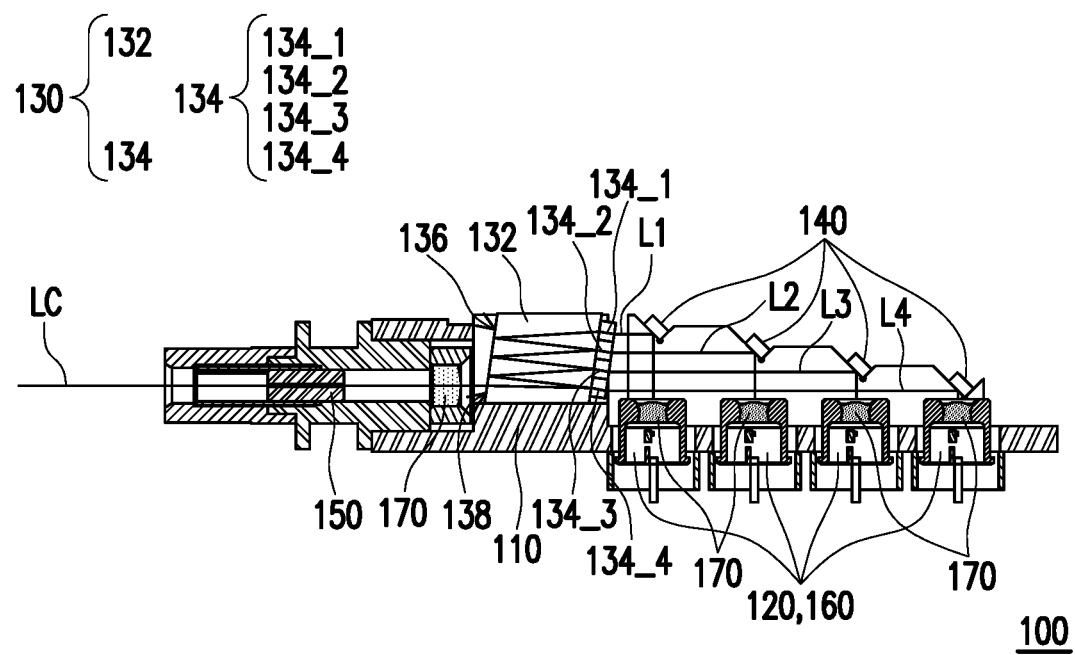
FIG. 4 is a schematic cross-sectional view taken along a line A-A' in FIG. 3.

FIG. 3 is a schematic top view of the wavelength division multiplexing module of FIG. 1. FIG. 4 is a schematic cross-sectional view taken along a line A-A' in FIG. 3. With reference to FIG. 1 to FIG. 4, in the present embodiment, the wavelength division multiplexing module 100 includes a housing 110, a plurality of light emitting elements 120, an optical division element 130, and a plurality of reflectors 140. In the present embodiment, a number of the light emitting elements 120 is, for example, four. But in some embodiments, the number of the light emitting elements 120 may be greater than four or less than four, which is not particularly limited by the invention. The light emitting elements 120 are disposed in the housing 110 and are adapted to provide light beams L1, L2, L3, and L4. In the present embodiment, the light emitting elements 120 are arranged in an extending direction of the housing 110. To be specific, the light emitting elements 120 are linearly arranged in the extending direction of the housing 110, emit light toward the housing 110, and are fixed to the housing 110 through soldering. In this way, the light emitting elements 120 may be easily calibrated, so that transmission precision of the light beams L1, L2, L3, and L4 is enhanced. At least two of the light emitting elements 120 are arranged in the extending direction of the housing 110. In the present embodiment, the number of the light emitting elements 120 is four, and three of the four light emitting elements 120 are arranged in the extending direction of the housing 110, which is not particularly limited by the invention.

In the present embodiment, wavelengths of the light beams L1, L2, L3, and L4 are different from one another. For instance, the wavelength of the light beam L1 is, for example, 1,270 nanometers, the wavelength of the light beam L2 is, for example, 1,290 nanometers, the wavelength of the light beam L3 is, for example, 1,310 nanometers, and the wavelength of the light beam L4 is, for example, 1,330 nanometers. In other words, in the present embodiment, there is a, for example, 20-nanometer wavelength difference among the light beams L1, L2, L3, and L4. Hence, the light beams L1, L2, L3, and L4 are adapted to be applied to a coarse wavelength division multiplexer so as to carry different signals individually. Nevertheless, in other embodiments, there may be a, for example, 5-nanomter wavelength difference among the light beams L1, L2, L3, and L4, so that the light beams L1, L2, L3, and L4 may be applied to a dense wavelength division multiplexer, which is not particularly limited by the invention.

The optical division element 130 is disposed on the housing 110 and a transmission path of the light beams L1, L2, L3, and L4 and is adapted to combine the light beams L1, L2, L3, and L4 to a mixed light beam LC. To be specific, the optical division element 130 includes a light transmission element 132, a plurality of selective reflection elements 134, and a reflection region 136 and a light transmission region 138 on one side opposite to the selective reflection elements 134. The light transmission element 132 is formed by a polygonal light transmission prism, such as a parallelogram-shaped prism, and the material of the light transmission element 132 is, for example, glass, plastic, and the like. Nevertheless, the invention is not intended to limit the prism types and material of the light transmission element 132.

The selective reflection elements 134 are, for example, light transmission sheets capable of reflecting light rays with specific wavelengths or light splitting sheets adapted to allow light rays with specific wavelengths to pass through, and the specific wavelengths individually correspond to the wavelengths of the light beams L1, L2, L3, and L4. Specifically, the selective reflection elements 134 include a first selective reflection element 134_1, a second selective reflection element, 134_2, a third selective reflection element 134_3, and a fourth selective reflection element 134_4. A specific wavelength of the first selective reflection element 134_1 corresponds to the wavelength of the light beam L1, a specific wavelength of the second selective reflection element 134_2 corresponds to the wavelength of the light beam L2, a specific wavelength of the third selective reflection element 134_3 corresponds to the wavelength of the light beam L3, and a specific wavelength of the fourth selective reflection element 134_4 corresponds to the wavelength of the light beam L4. Therefore, the light beams L1, L2, L3, and L4 may be smoothly transmitted and individually pass through the corresponding selective reflection elements 134 to enter the light transmission element 132.

The reflection region 136 is adapted to reflect the light beams L1, L2, and L3, and the light transmission region 138 is adapted to allow the mixed light beam LC to pass through. Therefore, the light beams L1, L2, and L3 are eventually emitted out of the optical division element 130 from the light transmission region 130 through reflection of the reflection region 136 and the first selective reflection element 134_1, the second selective reflection element 134_2, and the third selective reflection element 134_3. The light beam L4 is directly transmitted and passes through the fourth selective reflection element 134_4, the light transmission element 132, and the light transmission region 138. Specifically, the light beam L1 is transmitted, passes through the first selective reflection element 134_1 to enter the light transmission element 132, and is outputted from the light transmission region 138 to serve as a portion of the mixed light beam LC through reflection of the reflection region 136 and the second selective reflection element 134_2, the third selective reflection element 134_3, and the fourth selective reflection element 134_4. The light beam L2 is transmitted, passes through the second selective reflection element 134_2 to enter the light transmission element 132, and is outputted from the light transmission region 138 to serve as a portion of the mixed light beam LC through reflection of the reflection region 136 and the third selective reflection element 134_3 and the fourth selective reflection element 134_4. The light beam L3 is transmitted, passes through the third selective reflection element 134_3 to enter the light transmission element 132, and is outputted from the light transmission region 138 to serve as a portion of the mixed light beam LC through reflection of the reflection region 136 and the fourth selective reflection element 134_4. The light beam L4 is transmitted, passes through the fourth selective reflection element 134_4 to enter the light transmission element 132, and is outputted from the light transmission region 138 to serve as a portion of the mixed light beam LC.

In other words, when being transmitted to the fourth selective reflection element 134_4, the light beams L1, L2, L3, and L4 are combined to serve as the mixed light beam LC and are outputted through the light transmission region 138, as shown in FIG. 4. It is worth mentioning that in the present embodiment, the light beams L1, L2, L3, and L4 and the mixed light beam LC are transmitted on a same plane, such as a reference plane E shown in FIG. 3. In addition to that, in the present embodiment, a transmission path of the light beams L1, L2, L3, and L4 adjacent to the optical division element 130 and a transmission path of the mixed light beam LC adjacent to the optical division element 130 are parallel to each other. Hence, the design of the housing 110 may be simple, and the wavelength division multiplexing module 100 may be easily calibrated since light ray angles in the wavelength division multiplexing module 100 are susceptible to less changes, and that the steps of adjustment and assembly can be streamlined and production costs can be reduced.

The reflectors 140 are disposed on the housing 110 and the transmission path of the light beams L1, L2, L3, and L4 and are located between the light emitting elements 120 and the optical division element 130. To be specific, the number of the light emitting elements 120 are identical to a number of the reflectors 140. Further, the reflectors 140 are disposed across two different supporting points of the housing 110 so as to reflect the light beams L1, L2, L3, and L4 to the corresponding selective reflection elements 134. Hence, since the space in the extending direction of the housing 110 is effectively used as the light emitting elements 120 are disposed in the space, the volume of the wavelength division multiplexing module 100 is further reduced. In the present embodiment, an included angel between an extending direction of the reflectors 140 and the extending direction of the housing 110 is 45 degrees, which is not particularly limited by the invention.

In application, the wavelength division multiplexing module 100 of the present embodiment may further include a connection element 150 configured to connect light conduction devices of other types, such as connecting an optical fiber. The connection element 150 is disposed on the housing 110 and the transmission path of the mixed light beam LC and is located at one side of the optical division element 130 opposite to the light emitting elements 120. The connection element 150 is, for example, an optical fiber connector, but in other embodiments, the connection element 150 may be replaced with light transmission elements of other types as a conduction target changes, which is not particularly limited by the invention.

In the present embodiment, the wavelength division multiplexing module 100 further includes a plurality of collimating lens groups 170, which are respectively disposed on the transmission paths of the mixed light beam LC and the light beams L1, L2, L3, and L4. Specifically, in the present embodiment, there is a collimating lens group 170 between the connection element 150 and the optical division element 130, and four collimating lens groups 170 between the optical division element 130 and the four light emitting elements 120, and these collimating lens groups 170 correspond to different light emitting elements 120, respectively. Therefore, the light beams L1, L2, L3, and L4 can be made into parallel light.

In other embodiments, the wavelength division multiplexing module 100 may be applied to convert the mixed light beam LC to the light beams L1, L2, L3, and L4. To be specific, the light emitting elements 120 in the wavelength division multiplexing module 100 may be replaced with light receiving elements 160. The light receiving elements 160 are, for example, a combination of a light detector and a lens set, are disposed in the housing 110, and are adapted to receive the light beams L1, L2, L3, and L4. In this way, a light ray signal of each of the wavelength in the mixed light beam LC may be further detected.

Figure 5:
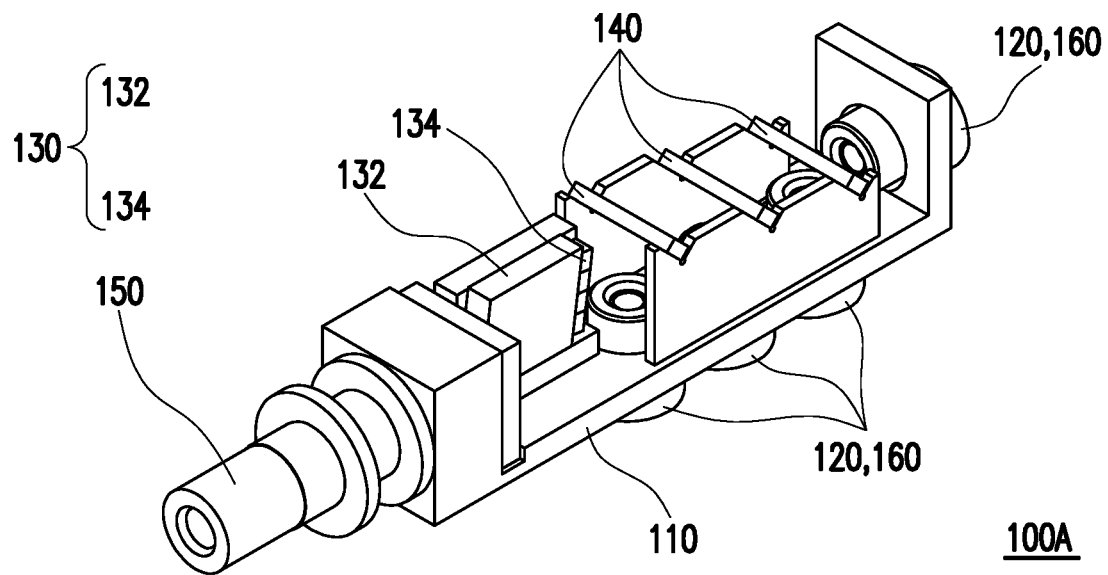
FIG. 5 is a schematic three-dimensional view of a wavelength division multiplexing module according to another embodiment of the invention.
Figure 6:
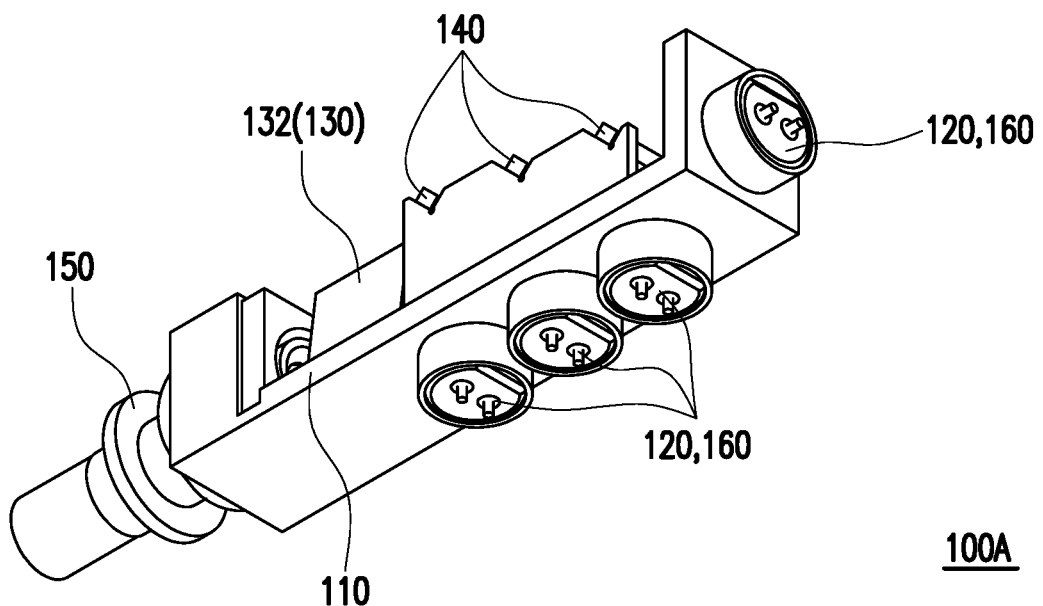
FIG. 6 is a schematic three-dimensional view of the wavelength division multiplexing module of FIG. 5 from another view angle.
Figure 7:
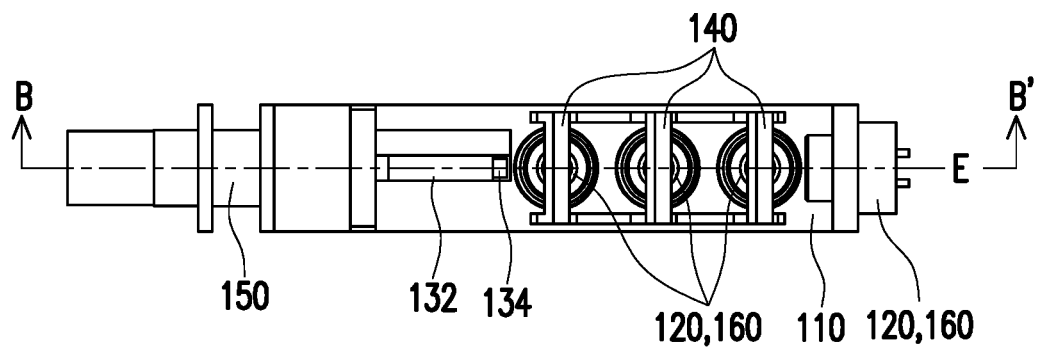
FIG. 7 is a schematic top view of the wavelength division multiplexing module of FIG. 5.
Figure 8:
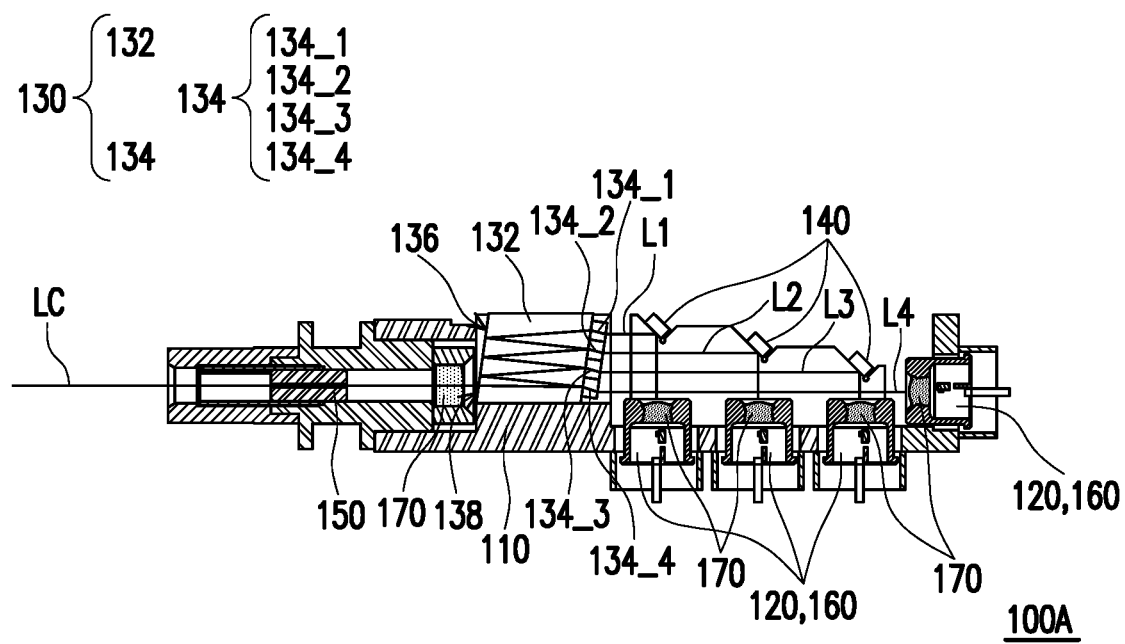
FIG. 8 is a schematic cross-sectional view taken along a line B-B' in FIG. 7.

FIG. 5 is a schematic three-dimensional view of a wavelength division multiplexing module according to another embodiment of the invention. FIG. 6 is a schematic three-dimensional view of the wavelength division multiplexing module of FIG. 5 from another view angle. FIG. 7 is a schematic top view of the wavelength division multiplexing module of FIG. 5. FIG. 8 is a schematic cross-sectional view taken along a line B-B' in FIG. 7. With reference to FIG. 5 to FIG. 8, a wavelength division multiplexing module 100A of the present embodiment is similar to the wavelength division multiplexing module 100 of FIG. 1. A difference therebetween is that in the present embodiment, the light emitting elements 120 or the light receiving elements 160 are disposed in a different manner. The following description is given by taking the light emitting elements 120 as an example.

Specifically, in the present embodiment, a light emitting direction of a portion of the light emitting elements 120 is parallel to the extending direction of the housing 110, and a number of the other portion of the light emitting elements 120 is identical to the number of the reflectors 140. For instance, in the present embodiment, the number of the light emitting elements 120 is four, and the light emitting direction of one of the light emitting elements 120 is parallel to the extending direction of the housing 110, as shown in FIG. 8. In other words, the light beam L4 emitted by the light emitting element 120 (i.e., the light emitting element 120 providing the light beam L4) having a light emitting direction parallel to the extending direction of the housing 110 may be directly transmitted to the optical division element 130. Hence, in the present embodiment, the number of the reflectors 140 is reduced by one because one reflector is saved. In this way, the materials used for and a length of the wavelength division multiplexing module 100A may be further saved and reduced, so that much space is saved. Related steps and implementation of replacing the structure of the light emitting elements 120 with the structure of the light receiving elements 160 in the wavelength division multiplexing module 100A may be obtained through sufficient teachings, suggestions, and other details in the art, and that detailed descriptions are not provided hereinafter.

In view of the foregoing, in the wavelength division multiplexing module provided by the invention, wavelength division or multiplexing is performed on the light beams or the mixed light beam through the reflection region and the light transmission region on one side of the optical division element. Further, at least two of the light emitting elements or the light receiving elements are arranged in the extending direction of the housing. Therefore, the design of the housing may be simple, the wavelength division multiplexing module may be easily calibrated since the light ray angles in the wavelength division multiplexing module are susceptible to less changes, and that the volume taken up by the wavelength division multiplexing module is effective reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wavelength division multiplexing module, adapted to combine a plurality of light beams to a mixed light beam, the wavelength division multiplexing module comprising:
   a housing;
   a plurality of light emitting elements, disposed in the housing, adapted to provide the light beams;
   an optical division element, disposed on the housing and in a transmission path of the light beams; and
   a plurality of reflectors, disposed on the housing and in the transmission path of the light beams, located between the light emitting elements and the optical division element, wherein the optical division element has a reflection region and a light transmission region on one side opposite to the light emitting elements, the reflection region is adapted to reflect a portion of the light beams, the light transmission region is adapted to allow the mixed light beam to pass through, and at least two of the light emitting elements are arranged in an extending direction of the housing, and
   wherein a light emitting direction of a portion of the light emitting elements is parallel to the extending direction of the housing, and a number of the other portion of the light emitting elements is identical to a number of the reflectors.

2. The wavelength division multiplexing module as claimed in claim 1, wherein wavelengths of the light beams are different.

3. The wavelength division multiplexing module as claimed in claim 1, wherein the light beams and the mixed light beam are transmitted on a same plane.

4. The wavelength division multiplexing module as claimed in claim 1, wherein the light emitting elements are fixed to the housing through soldering.

5. The wavelength division multiplexing module as claimed in claim 1, wherein the light emitting elements are arranged in the extending direction of the housing, and a number of the light emitting elements is identical to a number of the reflectors.

6. The wavelength division multiplexing module as claimed in claim 1, wherein an included angle between an extending direction of the reflectors and the extending direction of the housing is 45 degrees.

7. The wavelength division multiplexing module as claimed in claim 1, wherein the optical division element comprises a plurality of selective reflection elements disposed on one side opposite to the reflection region, the selective reflection elements are adapted to allow light ray with specific wavelengths to pass through, and specific wavelengths corresponding to the selective reflection elements individually correspond to wavelengths of the light beams.

8. The wavelength division multiplexing module as claimed in claim 1, further comprising:
   a connection element, disposed on the housing and in a transmission path of the mixed light beam.

9. The wavelength division multiplexing module as claimed in claim 1, wherein the transmission path of the light beams adjacent to the optical division element and a transmission path of the mixed light beam adjacent to the optical division element are parallel to each other.

10. A wavelength division multiplexing module, adapted to convert a mixed light beam to a plurality of light beams, the wavelength division multiplexing module comprising:
    a housing;
    a plurality of light receiving elements, disposed in the housing, adapted to receive the light beams;
    an optical division element, disposed on the housing and in a transmission path of the light beams; and
    a plurality of reflectors, disposed on the housing and in the transmission path of the light beams, located between the light receiving elements and the optical division element, wherein the optical division element has a reflection region and a light transmission region on one side opposite to the light receiving elements, the reflection region is adapted to reflect a portion of the light beams, the light transmission region is adapted to allow the mixed light beam to pass through, and at least two of the light receiving elements are arranged in an extending direction of the housing, and wherein an optical axis direction of a portion of the light receiving elements is parallel to the extending direction of the housing, and a number of the other portion of the light receiving elements is identical to a number of the reflectors.

11. The wavelength division multiplexing module as claimed in claim 10, wherein wavelengths of the light beams are different.

12. The wavelength division multiplexing module as claimed in claim 10, wherein the light beams and the mixed light beam are transmitted on a same plane.

13. The wavelength division multiplexing module as claimed in claim 10, wherein the light receiving elements are fixed to the housing through soldering.

14. The wavelength division multiplexing module as claimed in claim 10, wherein the light receiving elements are arranged in the extending direction of the housing, and a number of the light receiving elements is identical to a number of the reflectors.

15. The wavelength division multiplexing module as claimed in claim 10, wherein an included angle between an extending direction of the reflectors and the extending direction of the housing is 45 degrees.

16. The wavelength division multiplexing module as claimed in claim 10, wherein the optical division element comprises a plurality of selective reflection elements disposed on one side opposite to the reflection region, the selective reflection elements are adapted to allow light ray with specific wavelengths to pass through, and specific wavelengths corresponding to the selective reflection elements individually correspond to wavelengths of the light beams.

17. The wavelength division multiplexing module as claimed in claim 10, further comprising:
    a connection element, disposed on the housing and in a transmission path of the mixed light beam.

18. The wavelength division multiplexing module as claimed in claim 10, wherein the transmission path of the light beams adjacent to the optical division element and a transmission path of the mixed light beam adjacent to the optical division element are parallel to each other.

* * * * *